(12) United States Patent
Maenishi et al.

(10) Patent No.: US 9,890,883 B2
(45) Date of Patent: Feb. 13, 2018

(54) PIPE JOINT, PACKING RING, AND METHOD FOR MOUNTING PIPE JOINT

(75) Inventors: Tamotsu Maenishi, Osaka (JP); Yasuyuki Nagamori, Osaka (JP); Koji Taniwaki, Osaka (JP)

(73) Assignee: Waterworks Technology Development Organization Co., Ltd., Osaka (JP)

( * ) Notice: Subject to any disclaimer, the term of this patent is extended or adjusted under 35 U.S.C. 154(b) by 683 days.

(21) Appl. No.: 13/702,801

(22) PCT Filed: Sep. 3, 2010

(86) PCT No.: PCT/JP2010/065125
§ 371 (c)(1),
(2), (4) Date: Dec. 7, 2012

(87) PCT Pub. No.: WO2011/155082
PCT Pub. Date: Dec. 15, 2011

(65) Prior Publication Data
US 2013/0076027 A1    Mar. 28, 2013

(30) Foreign Application Priority Data
Jun. 8, 2010 (JP) .................. 2010-131327

(51) Int. Cl.
*F16L 21/04* (2006.01)
*F16L 21/08* (2006.01)

(52) U.S. Cl.
CPC ............... *F16L 21/04* (2013.01); *F16L 21/08* (2013.01)

(58) Field of Classification Search
USPC ........................................ 285/339–343, 348
See application file for complete search history.

(56) References Cited

U.S. PATENT DOCUMENTS 1,563,161 A * 11/1925 Christenson .......... F16L 27/053
277/507
2,406,488 A * 8/1946 Hudson .................. F16L 19/10
285/342

(Continued)

FOREIGN PATENT DOCUMENTS

DE    9320828 U1    2/1995
EP    1281907 A2    2/2003

(Continued)

OTHER PUBLICATIONS

Office Action dated Apr. 9, 2013 in corresponding Japanese Patent Application No. 2009-114782.

(Continued)

*Primary Examiner* — Aaron Dunwoody
*Assistant Examiner* — Fannie Kee
(74) *Attorney, Agent, or Firm* — Knobbe, Martens, Olson & Bear, LLP

(57) ABSTRACT

A pipe joint is provided with a pressing ring, a pipe or a pipe joint body having a containing section, a tightening element, and a packing ring compressed by being pressed by the pressing ring moved by the operation of the tightening element. The packing ring includes a base section fitted and mounted in the containing section at a rear thereof, a seal section contained within the containing section at a front thereof, and a connection section which connects the base section and the seal section and has a cutout groove. When the packing ring positioned by fitting and mounting the base section in the containing section at the rear thereof is subjected to pressing by the pressing ring, the seal section is bent into the cutout groove and is deformed, and compression caused by the deformation creates a sealed state.

8 Claims, 15 Drawing Sheets

(56) References Cited

U.S. PATENT DOCUMENTS

| | | | | |
|---|---|---|---|---|
| 5,803,513 | A * | 9/1998 | Richardson | F16L 21/08 285/337 |
| 6,019,396 | A | 2/2000 | Saito et al. | |
| 6,086,111 | A * | 7/2000 | Harper | F16L 21/08 285/322 |
| 6,203,073 | B1 * | 3/2001 | Sato | F16L 21/04 285/337 |
| 6,481,762 | B1 * | 11/2002 | Rex | F16L 17/025 285/104 |
| 6,945,570 | B2 * | 9/2005 | Jones | F16L 21/04 285/104 |
| 2003/0025329 | A1 * | 2/2003 | Saito | F16L 21/08 285/337 |
| 2005/0218652 | A1 * | 10/2005 | Sakamoto | F16L 21/08 285/343 |

FOREIGN PATENT DOCUMENTS

| | | |
|---|---|---|
| EP | 1582799 A1 | 10/2005 |
| EP | 2000728 A1 | 12/2008 |
| GB | 749395 A | 5/1956 |
| GB | 2251905 A | 7/1992 |
| GB | 2346422 A | 8/2000 |
| JP | 4-056288 A | 5/1992 |
| JP | 6241359 A | 8/1994 |
| JP | 7-332553 A | 12/1995 |
| JP | 9-144962 A | 6/1997 |
| JP | H11-325347 A | 11/1999 |
| JP | 2003-222276 A | 8/2003 |
| JP | 3897433 B2 | 1/2007 |
| JP | 2008-082494 A | 4/2008 |
| JP | 4144675 B2 | 9/2008 |
| JP | 4200558 B2 | 12/2008 |

OTHER PUBLICATIONS

Extended Search Report in corresponding EP Patent Application No. 10852917.3 dated Apr. 22, 2014.

Office Action dated Aug. 9, 2016 in corresponding Application No. 10852917.3.

* cited by examiner (a)

(b)

Prior Art

Prior Art

PIPE JOINT, PACKING RING, AND METHOD FOR MOUNTING PIPE JOINT

TECHNICAL FIELD

The present invention relates to a pipe joint used for joining water pipes and the like, a packing ring used therefor, and a method for mounting the pipe joint.

BACKGROUND ART

FIG. 22 is a cross-sectional view showing an essential part of a conventional pipe joint. A pipe joint 30 joins a pipe 31 to be joined and a pipe (not shown) to be joined thereto in a water-tight manner. A compressed packing ring 35 seals a space between a pipe joint body 32 fitted over both the pipes to be joined and the pipe 31. A pressing ring 33 is connected to the flange of the pipe joint body 32 by a tightening element 34 including a bolt and a nut. A lock ring 36 which is split at one point in the peripheral direction is contained within the pressing ring 33 on the inner peripheral side thereof. A piece ring 37 is interposed between the lock ring 36 and the packing ring 35.

At the time of piping, from a temporarily mounted state as shown in FIG. 23, the tightening element 34 is operated to move the pressing ring 33 toward the pipe joint body 32, and the packing ring 35 is then press-fitted into a containing section 32a of the pipe joint body 32 by being pressed by the pressing ring 33. As shown in FIG. 24, the packing ring 35 has a seal section 35a that has a circular cross section, a base section 35b that has a rectangular cross section, and a lip section 35c that is projection-shaped. The seal section 35a is press-fitted into the containing section 32a at the rear thereof. The base section 35b is arranged in the containing section 32a at the front thereof. The seal section 35a is larger than the rear of the containing section 32a. The compressed seal section 35a mainly makes contact with the pipe 31.

However, in the pipe joint having such a configuration, the packing ring 35 is compressed while being moved in the pipe axis direction. Therefore, the pipe 31 may be pulled when the packing ring 35 is press-fitted into the containing section 32a. Due to the pull of the pipe 31, in a sealed state shown in FIG. 22, the pipe 31 is dislocated by a distance L from the state of FIG. 23, resulting in changing of an insertion amount. For this reason, when the pipe joint is mounted, it is necessary to set the initial insertion amount to be somewhat smaller by taking the pull of the pipe into account.

A pipe joint described in Patent Document 1 listed below has a packing ring in which the minimum inside diameter at the time of non-pressing is set to be larger than the outside diameter of the pipe to be joined. However, as in the conventional pipe joint, to mount the pipe joint to create the sealed state, the packing ring is required to be compressed while being moved in the pipe axis direction by being pressed by a pressing ring. As a result, the pipe to be joined may also be pulled.

When such pull of the pipe to be joined occurs, the insertion resistance of the pipe to be joined is increased. Therefore, the piping efficiency can be deteriorated. In addition, to increase the piping efficiency, it is greatly advantageous that sealing is enabled by the packing ring while the initial insertion amount of the pipe to be joined is held. Therefore, a method which can prevent the pull of the pipe to be joined has been strongly desired.

In the pipe joint 30 in the temporarily mounted state shown in FIG. 23, the pressing ring 33 is connected to the pipe joint body 32 with a predetermined space, and between the pressing ring 33 and the pipe joint body 32, the packing ring 35, the lock ring 36, and the piece ring 37 are integrally held. From this state, the tightening element 34 is tightened to move the pressing ring 33 toward the pipe joint body 32. Then, as described above, the pressing ring 33 press-fits the packing ring 35 into the containing section 32a of the pipe joint body 32. And, the inner peripheral surface of the lock ring 36 reduced in diameter is engaged with the outer peripheral surface of the pipe 31.

Conventionally, to reduce the number of operations at a piping site, the pipe joint 30 which is previously temporarily mounted in an assembling factory is conveyed to the piping site, and the operator simply tightens the tightening element 34 at the piping site. However, when the tightening element 34 is tightened to accidentally compress the packing ring 35 due to vibration and the like at the time of conveyance, the sealing performance after the piping may be varied, with the result that the insertion of the pipe 31 into the pipe joint body 32 may be inhibited. Therefore, in the temporarily mounted pipe joint 30, it is important to regulate the advancing movement of the pressing ring 33 toward the pipe joint body 32.

Patent Document 2 listed below describes a pipe joint in which a spacer widened in the pipe axis direction is detachably engaged with a bolt which connects a joint body and a pressing ring, so that the advancing movement of the pressing ring toward the joint body can be regulated. However, in the pipe joint, the number of necessary spacers is increased according to the number of bolts, with the result that the number of components is increased. In addition, unpreferably, when the bolt is tightened to move the pressing ring toward the joint body, the detached spacer can be a nuisance to the operator.

Patent Document 3 listed below describes a pipe joint which has an interval regulation member provided between a separation prevention member and an elastic seal material. The interval regulation member regulates the interval between a socket pipe section and a pressing ring until the elastic seal material is brought into a set compression state and is sheared to release the interval regulation when the elastic seal material is brought into the set compression state. However, in the pipe joint, when the pressing ring is tightened and fixed onto the socket pipe section, the interval regulation member is sheared. In a case where the pipe joint is dismounted after the completion of piping due to some circumstances, the pipe joint cannot be reused as is.

PRIOR ART DOCUMENTS

Patent Documents

Patent Document 1: JP 4144675
Patent Document 2: JP 4200558
Patent Document 3: JP 3897433

SUMMARY OF THE INVENTION

Problems to be Solved by the Invention

The present invention has been made in view of the above circumstances, and an object of a first invention is to provide a pipe joint which can prevent the pull of a pipe to be joined at the time of mounting, a packing ring used therefor, and a method for mounting the pipe joint. Further, an object of a second invention is to provide a pipe joint which can regulate advancing movement of a pressing ring in a temporarily mounted state, can prevent increase in the number of components, and can be reused after dismounting, and a method for mounting the pipe joint.

Means for Solving the Problems

The pipe joint according to the first invention is a pipe joint comprising: a pressing ring fitted over a pipe to be joined; a pipe or a pipe joint body which has a containing section expanded in diameter toward the pressing ring and into which the pipe to be joined is inserted through the containing section; a tightening element capable of operating and moving the pressing ring toward the pipe or the pipe joint body; and a packing ring compressed by being pressed by the pressing ring that is moved by the operation of the tightening element, wherein the packing ring includes a base section fitted and mounted in the containing section at a rear thereof, a seal section contained within the containing section at a front thereof, and a connection section which connects the base section and the seal section and has a cutout groove formed on an outer peripheral side thereof, when the packing ring positioned by fitting and mounting the base section in the containing section at the rear thereof is subjected to pressing by the pressing ring, the seal section is bent into the cutout groove and is deformed, and compression caused by the deformation creates a sealed state.

In the pipe joint described above, from a state where the packing ring is positioned, the seal section is deformed by being pressed by the pressing ring, and compression caused by the deformation creates the sealed state. Therefore, the packing ring is compressed without being moved in the pipe axis direction, and the pipe to be joined is not pulled when the pipe joint is mounted. The packing ring has the cutout groove formed on the outer peripheral side thereof. When the packing ring is subjected to pressing by the pressing ring, the seal section is bent into the cutout groove and is deformed, and the seal section and the connection section which are strongly compressed to the inner peripheral side thereof makes contact with the pipe to be joined. In this way, while being positioned with respect to the containing section at the rear thereof, the packing ring makes contact with the outer peripheral surface of the pipe to be joined at the front of the containing section. Therefore, the sealed state by the compression of the packing ring can be smoothly created.

In the pipe joint according to the first invention, it is preferable that in a state where the packing ring is not compressed, the seal section has a circular cross section, and a rear side surface of the seal section is smoothly joined to a groove bottom surface of the cutout groove. According to such a configuration, when the packing ring is subjected to pressing by the pressing ring, the seal section is bent into the cutout groove and can be easily deformed. As a result, the seal section can be smoothly deformed from a state where the packing ring is positioned, and the sealed state can be created more reliably.

In the pipe joint according to the first invention, it is preferable that a piece ring having a flanged section which projects toward the packing ring is interposed between the pressing ring and the packing ring, and the flanged section is pressed onto the outer peripheral side of the seal section from a pipe axis direction. According to such a configuration, the outer peripheral side portion of the seal section is precisely subjected to pressing by the pressing ring through the piece ring from the pipe axis direction. Therefore, the seal section can be efficiently bent into the cutout groove. As a result, the seal section can be smoothly deformed from a state where the packing ring is positioned, and the sealed state can be created more reliably. Further, it is unnecessary to directly press the packing ring by the pressing ring, and the shape of the pressing ring is not limited. Accordingly, the existing pressing ring can be used, which is economical.

In the pipe joint according to the first invention, it is preferable that in a state where the base section is fitted and mounted in the containing section at the rear thereof to position the packing ring and the seal section is not deformed, a minimum inside diameter of the packing ring is larger than an outside diameter of the pipe to be joined. According to such a configuration, from a state where the packing ring is positioned with respect to the containing section, the pipe to be joined can be smoothly inserted into the pipe or the pipe joint body through the containing section. Further, in case where the pressing ring and the packing ring are temporarily mounted onto the pipe or the pipe joint body, the pipe to be joined can be smoothly inserted into the temporarily mounted article.

In the pipe joint according to the first invention, it is preferable that the base section is formed of a harder material than the seal section. According to such a configuration, the compression of the base section in the pipe axis direction can be suppressed. Therefore, the pull of the pipe to be joined can be easily prevented, and the seal section can be preferentially subjected to the pressing force of the pressing ring. In addition, the seal section becomes relatively soft, so that the seal section is easily deformed to improve the contactability with the pipe to be joined. Therefore, the sealing performance by the packing ring can be enhanced.

Further, the packing ring according to the first invention is a packing ring for sealing a space between a containing section of a pipe or a pipe joint body into which a pipe to be joined is inserted and an outer peripheral surface of the pipe to be joined, wherein the packing ring includes a base section capable of being fitted and mounted in the containing section at a rear thereof, a seal section capable of being contained within the containing section at a front thereof, and a connection section which connects the base section and the seal section and has a cutout groove formed on an outer peripheral side thereof, and the seal section pressed from a pipe axis direction is formed to be bent into the cutout groove and deformed. In the pipe joint using the packing ring, the pull of the pipe to be joined can be prevented when the pipe joint is mounted as described above.

Further, the method for mounting a pipe joint according to the first invention is a method for mounting a pipe joint which seals a space between a containing section of a pipe or a pipe joint body into which a pipe to be joined is inserted and an outer peripheral surface of the pipe to be joined by a packing ring, the method comprising: a first step of fitting and mounting the packing ring in the containing section at a rear thereof of the pipe or the pipe joint body and positioning the packing ring with respect to the containing section; a second step of inserting the pipe to be joined into the pipe or the pipe joint body through the containing section; a third step of moving a pressing ring fitted over the pipe to be joined toward the pipe or the pipe joint body; and a fourth step of bending a rear end of the packing ring into the rear of the containing section by pressing by the pressing ring and creating a sealed state by compression caused by deformation of the bending.

In the method for mounting the pipe joint, from a state where the packing ring is positioned with respect to the containing section of the pipe or the pipe joint body, the rear end of the packing ring is subjected to pressing by the pressing ring to be bent into the rear of the containing section, and compression caused by the bending deformation creates the sealed state. Therefore, the packing ring is compressed without being moved in the pipe axis direction, and the pipe to be joined is not pulled when the pipe joint is mounted.

The pipe joint according to the second invention is a pipe joint which has a pipe or a pipe joint body into which a pipe to be joined is inserted, a pressing ring fitted over the pipe to be joined, a lock ring fitted onto an inner peripheral surface of the pressing ring, a tightening element capable of operating and moving the pressing ring toward the pipe or the pipe joint body, and a packing ring which is compressed by being pressed by the pressing ring that is moved by the operation of the tightening element and seals a space between an inner peripheral surface of the pipe or the pipe joint body and an outer peripheral surface of the pipe to be joined, wherein a slide piece arranged between the lock ring and the packing ring has a body section extending in a pipe peripheral direction, and a projection section which projects from the body section to the outer peripheral side thereof and extends in a pipe axis direction to be received by the pipe or the pipe joint body from the pipe axis direction, on the inner peripheral surface of the pressing ring, a temporary retaining section having a rear surface capable of receiving a back surface of the projection section from the pipe axis direction and an introducing section which is located toward a rear thereof from the temporary retaining section in the pipe axis direction and allows introduction of the projection section are formed in different positions in the pipe peripheral direction.

In the pipe joint described above, the projection section of the slide piece arranged between the lock ring and the packing ring is received by the pipe or the pipe joint body from the pipe axis direction. In case where the projection section is arranged in the temporary retaining section of the pressing ring, the back surface of the projection section is received by the rear surface of the temporary retaining section from the pipe axis direction. Thereby, the advancing movement of the pressing ring toward the pipe or the pipe joint body is regulated for providing temporary mounting. In addition, when the slide piece is slid in the pipe peripheral direction to arrange the projection section in the introducing section of the pressing ring, the movement regulation of the pressing ring is released. Then, by tightening the tightening element, the pressing ring is moved toward the pipe or the pipe joint body while the projection section is introduced into the introducing section.

In the pipe joint according to the second invention, the advancing movement of the pressing ring can be regulated in the temporarily mounted state, and the operation of releasing the movement regulation of the pressing ring can be easily performed. Besides, unlike a spacer engaged with the bolt, the use of the above-described slide piece does not increase the number of components. In addition, it is unnecessary to break the slide piece. Therefore, even when the pipe joint is dismounted after the completion of piping, the pipe joint can be reused as is.

In the pipe joint according to the second invention, it is preferable that a positioning section which receives the slide piece from the pipe peripheral direction and positions the projection section with respect to the introducing section is formed. According to such a configuration, the slide piece slid in the pipe peripheral direction is received by the positioning section. Therefore, the projection section can be reliably positioned into the introducing section. Thereby, the operation of releasing the movement regulation of the pressing ring can be easy.

In the pipe joint according to the second invention, it is preferable that a piece ring which compresses the packing ring by pressing by the pressing ring that is moved by the operation of the tightening element is arranged between the slide piece and the packing ring. Accordingly, it is unnecessary to directly press the packing ring by the pressing ring, and the shape of the pressing ring is not limited. Thereby, the existing pressing ring can be used, which is economical.

In the pipe joint according to the second invention, it is preferable that as the projection section enters into the rear of the introducing section, the lock ring pressed by the body section is reduced in diameter. According to such a configuration, after the movement regulation of the pressing ring is released, the tightening element is tightened to move the pressing ring toward the pipe or the pipe joint body. Therefore, the pressing of the body section with such movement can reduce the lock ring in diameter to prevent the separation of the pipe to be joined.

In the pipe joint according to the second invention, it is preferable that the packing ring has a base section contained within the pipe or the pipe joint body at the rear of the inner peripheral surface thereof, a seal section contained within the pipe or the pipe joint body at the front thereof, and a connection section which connects the base section and the seal section and has a cutout groove formed on the outer peripheral side thereof, and when the seal section is subjected to pressing by the pressing ring, the seal section is bent into the cutout groove and is deformed, and compression caused by the deformation creates a sealed state.

According to such a configuration, compression caused by the bending deformation of the seal section as described above creates the sealed state. Therefore, when the tightening element is tightened to move the pressing ring toward the pipe or the pipe joint body, it is unnecessary to move the packing ring in the pipe axis direction. As a result, the moving distance of the pressing ring is shortened to reduce the tightening amount of the tightening element, and the slide piece can be made compact. In addition, the pull of the pipe to be joined to the joint body side can be prevented to make the insertion amount of the pipe to be joined constant.

Further, the method for mounting a pipe joint according to the second invention is a method for mounting a pipe joint which includes a pipe or a pipe joint body into which a pipe to be joined is inserted, a pressing ring fitted over the pipe to be joined, a lock ring fitted onto an inner peripheral surface of the pressing ring, a tightening element capable of operating and moving the pressing ring toward the pipe or the pipe joint body, and a packing ring which is compressed by being pressed by the pressing ring that is moved by the operation of the tightening element and seals a space between an inner peripheral surface of the pipe or the pipe joint body and an outer peripheral surface of the pipe to be joined, the method comprising: an insertion step in which a slide piece arranged between the lock ring and the packing ring is received by the pipe or the pipe joint body and the pressing ring from a pipe axis direction, the tightening element is tightened to temporarily mount the pipe joint, and the pipe to be joined is inserted into the pipe or the pipe joint body; a releasing step in which the slide piece is slid in a pipe peripheral direction to release the reception of the slide piece by the pressing ring in the pipe axis direction; and a tightening step in which, after the releasing step, the tightening element is further tightened to move the pressing ring toward the pipe or the pipe joint body.

In the method for mounting the pipe joint, in the temporarily mounted state, the slide piece arranged between the lock ring and the packing ring is received by both the pipe or the pipe joint body and the pressing ring from the pipe axis direction. Therefore, the advancing movement of the pressing ring toward the pipe or the pipe joint body can be appropriately regulated. Then, when the slide piece is slid in the pipe peripheral direction, the reception of the slide piece by the pressing ring in the pipe axis direction is released, and the tightening element is further tightened. Thereby, the pressing ring can be moved toward the pipe or the pipe joint body.

In the method for mounting the pipe joint according to the second invention, the advancing movement of the pressing ring can be regulated in the temporarily mounted state, and the operation of releasing the movement regulation of the pressing ring can be easily performed. Besides, as mentioned above, the number of components does not increase, and even when the pipe joint is dismounted after the completion of piping, the pipe joint can be reused as is.

MODE FOR CARRYING OUT THE INVENTION

An embodiment of the present invention will be explained with reference to the drawings.

[First Invention]

Figure 1:
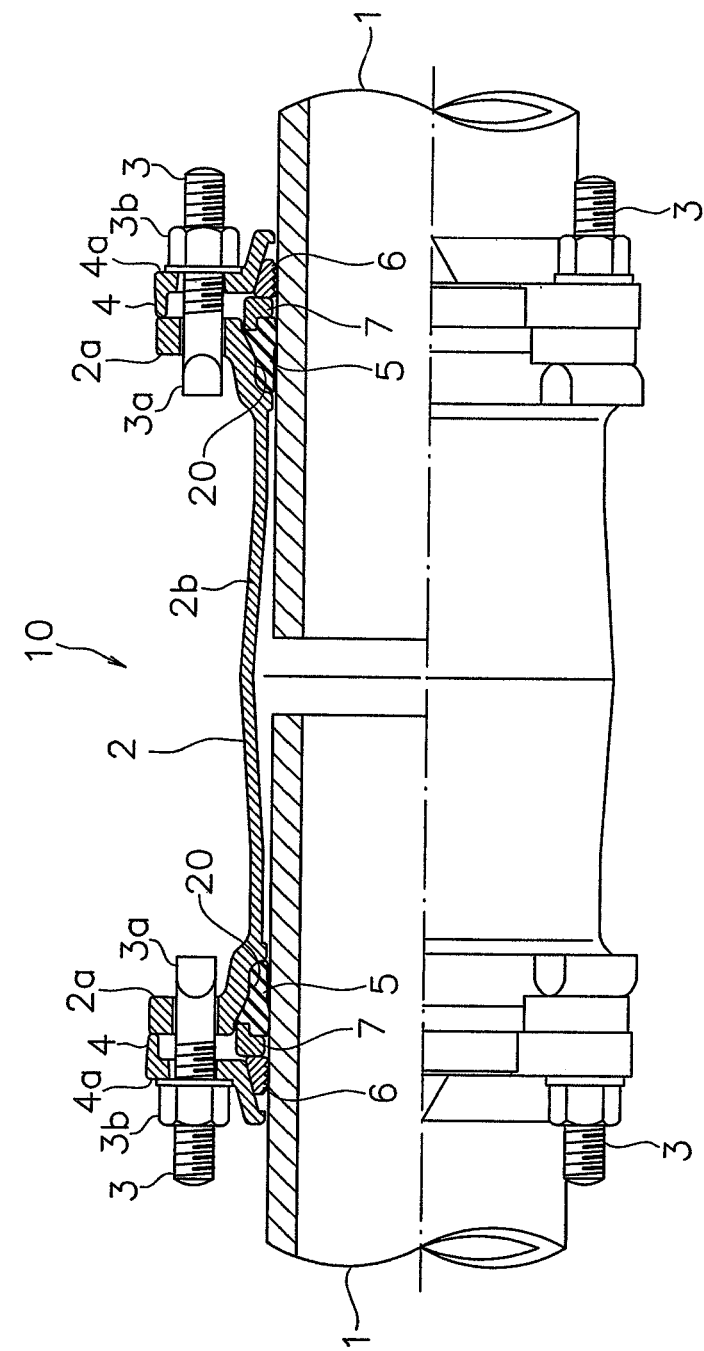
FIG. 1 is a half cross-sectional view showing an example of a pipe joint according to a first invention.
Figure 2:
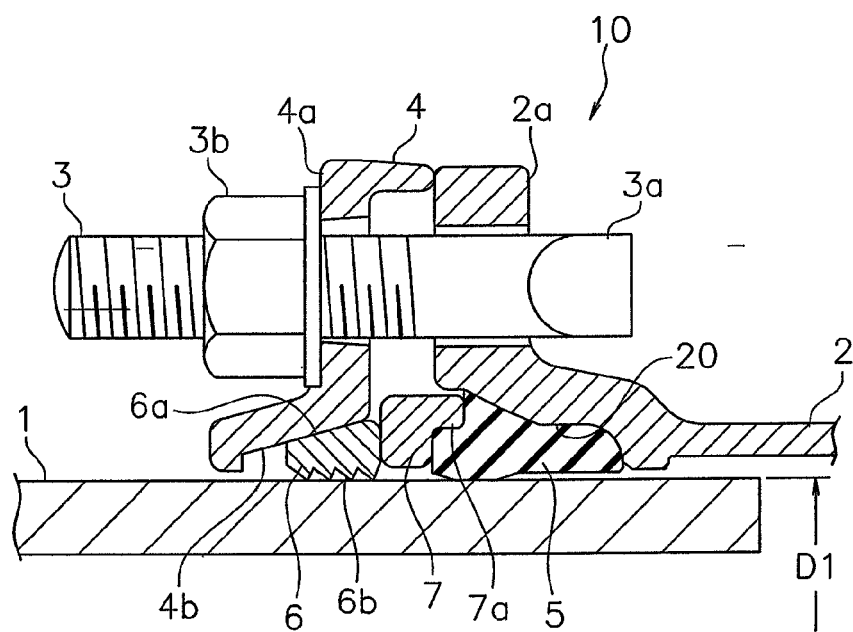
FIG. 2 is an enlarged view of an essential part of the pipe joint shown in FIG. 1.

FIG. 1 is a half cross-sectional view showing an example of a pipe joint according to a first invention, and FIG. 2 is an enlarged view of the essential part thereof. A pipe 1 to be joined is a water pipe made of polyethylene. However, the pipe 1 is not limited thereto, and may be a fluid pipe made of other materials, such as a polyvinyl chloride pipe. FIGS. 1 and 2 show a sealed state after piping in which the pipe joint is mounted on two pipes 1, 1 to be joined and joined them in a water-tight manner.

A pipe joint 10 has a pressing ring 4 fitted over the pipe 1 to be joined, a pipe joint body 2 (hereinafter, simply called a "joint body 2") which has a containing section 20 expanded in diameter toward the pressing ring 4 and into which the pipe 1 is inserted through the containing section 20, a tightening element 3 including a T-head bolt 3a and a nut 3b, and a packing ring 5 which seals a space between the outer peripheral surface of the pipe 1 and the joint body 2. In addition, in this embodiment, a lock ring 6 as a separation prevention member is fitted onto the inner peripheral side of the pressing ring 4, and a piece ring 7 is interposed between the lock ring 6 and the packing ring 5.

The joint body 2 is arranged between a pair of pressing rings 4, and is fitted and mounted over the outer periphery of the pipe 1 with a peripheral gap. The joint body 2 has flanged projection sections 2a at both ends thereof, integrally has a tubular barrel section 2b, which center portion is swelled outward, between the projection sections 2a, and has the containing section 20 on the inner peripheral side of each of the projection sections 2a. Bolt holes for inserting the T-head bolts 3a therethrough are provided in plural positions (e.g., four) of the peripheral direction in the projection sections 2a. The joint body 2 is made of a ductile iron. However, the joint body 2 is not limited thereto, and may be formed of a stainless steel and a synthetic resin.

Figure 3:
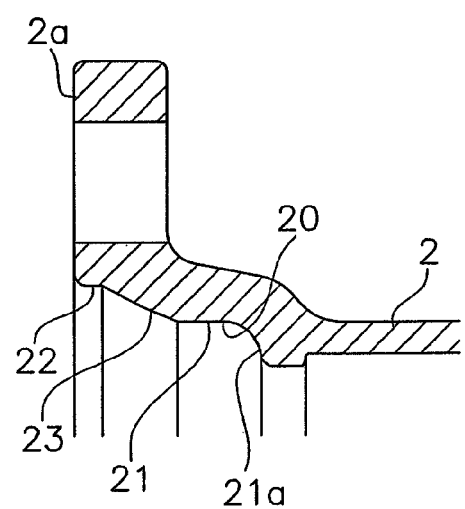
FIG. 3 is an enlarged sectional view of a containing section.

The containing section 20 is expanded in diameter toward the pressing ring 4 opposite thereto, and contains therein the packing ring 5. As shown in FIG. 3, the containing section 20 of this embodiment has a small diameter section 21 located at the rear thereof in the insertion direction of the pipe 1 (the direction toward the right side in FIG. 3), a large diameter section 22 located at the front thereof, and an inclined surface section 23 in which the inside diameter thereof is changed in a taper shape so as to join the small diameter section 21 and the large diameter section 22. A curved wall 21a is provided at the rearmost end of the small diameter section 21. The minimum inside diameter of the wall 21a is set to be larger than an outside diameter D1 of the pipe 1.

The pressing ring 4 has a flanged projection section 4a opposite to the projection section 2a of the joint body 2. The projection section 4a has bolt holes for inserting the T-head bolt 3a therethrough. The projection section 2a and the projection section 4a are sandwiched between the head of the T-head bolt 3a and the nut 3b. The joint body 2 and the pressing ring 4 are strongly tightened by the tightening element 3. A taper surface 4b expanded in diameter toward the containing section 20 is formed on the inner peripheral side of the pressing ring 4, and presses the lock ring 6 to the inner peripheral side thereof.

The lock ring 6 is made of a harder material than the pipe 1, has an outer peripheral surface 6a which is formed in a taper shape with substantially the same inclination as the taper surface 4b, and an inner peripheral surface which has a blade 6b which can bite into the outer peripheral surface of the pipe 1. The lock ring 6 is split at one point in the peripheral direction, and can be reduced in diameter by elastic deformation. In a state where no external stress is applied, the maximum outside diameter of the lock ring 6 is larger than the maximum inside diameter of the taper surface 4b.

The piece ring 7 is interposed between the pressing ring 4 and the packing ring 5, and transmits pressing by the pressing ring 4 that is moved by the operation of the tightening element 3 to the packing ring 5 at the time of piping. The piece ring 7 is a metal product made of, e.g., a casting, and is formed in an L-shaped cross section having a flanged section 7a projecting toward the packing ring 5. The flanged section 7a is pressed onto the outer peripheral side portion at the rear end of the packing ring 5 from the pipe axis direction. In this embodiment, the flanged section 7a has an outside diameter which is slightly smaller than the inside diameter of the large diameter section 22, and enters into the containing section 20 in the sealed state.

Figure 4:
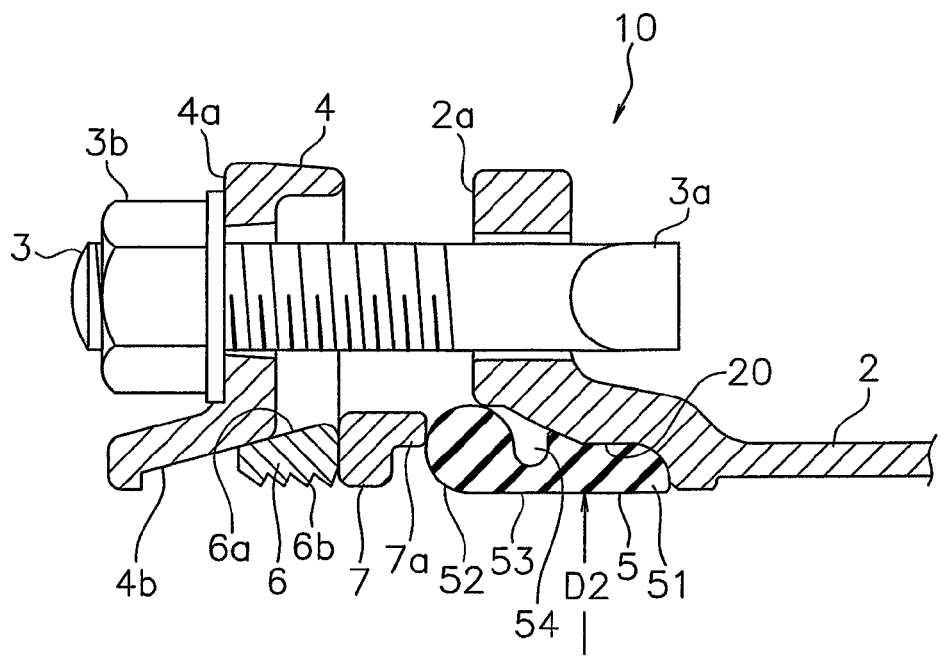
FIG. 4 is a cross-sectional view showing a temporarily mounted state of the pipe joint shown in FIG. 1.
Figure 5:
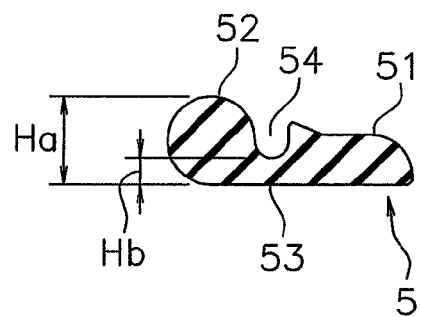
FIG. 5 is a cross-sectional view of a packing ring.

FIG. 4 is a cross-sectional view showing a temporarily mounted state of the pipe joint 10, and FIG. 5 is a cross-sectional view of the packing ring 5 in a natural state in which no external stress such as compression is applied. The pressing ring 4 can be moved toward the joint body 2 by the operation of the tightening element 3. The packing ring 5 is compressed by being pressed by the moving pressing ring 4. That is, the pipe 1 is inserted into the temporarily mounted article shown in FIG. 4, and the tightening element 3 is tightened, thereby the sealed state shown in FIGS. 1 and 2 is created.

In the temporarily mounted state, the respective members such as the packing ring 5 have been already mounted. Therefore, the piping time can be greatly reduced. That is, the pipe 1 is inserted into the temporarily mounted article, and the tightening element 3 is tightened, thereby completing mounting. Accordingly, the pipe joint 10 temporarily mounted in a factory or the like is conveyed to a piping site to omit the attaching operation of the pressing ring 4 and the tightening element 3 at the piping site. In the sealed state, the packing ring 5 is partially deformed. However, the relative position of the packing ring 5 with respect to the containing section 20 in the sealed state is not substantially changed from the temporarily mounted state.

The packing ring 5 has a base section 51 fitted and mounted in the containing section 20 at the rear thereof, a seal section 52 contained within the containing section 20 at the front thereof, and a connection section 53 which connects the base section 51 and the seal section 52 and has a cutout groove 54 formed on the outer peripheral side thereof. The packing ring 5 in the natural state has an inside diameter which is substantially constant, and an outside diameter which is the maximum in the seal section 52. The material of the packing ring 5 is not particularly limited as long as it is elastic. However, the packing ring 5 is preferably made of rubber, specifically, SBR (styrene butadiene rubber).

As shown in FIGS. 4 and 5, the base section 51 has a cross sectional shape corresponding to the rear of the containing section 20. That is, the base section 51 has a front end curved along the wall 21a, and an outline of the outer peripheral surface thereof from the front end to the cutout groove 54 has a shape along the inner surfaces of the small diameter section 21 and the inclined surface section 23. Therefore, as shown in FIG. 4, the base section 51 can be fitted and mounted in the containing section 20 at the rear thereof without being compressed or by being only slightly compressed. In this embodiment, the base section 51 is fitted and mounted so as to be buried into the small diameter section 21 while slightly projecting to the inclined surface section 23.

In the temporarily mounted state, the base section 51 is fitted and mounted in the containing section 20 at the rear thereof, and the seal section 52 is substantially undeformed. A minimum inside diameter D2 of the packing ring 5 in this state is set to be larger than outside diameter D1 of the pipe 1. In addition, the front end of the base section 51 is abutted to the wall 21a, and the outer peripheral surface of the base section 51 is abutted to the inner surface of the small diameter section 21. Thereby, the aligned packing ring 5 is positioned with respect to the containing section 20 in the pipe axis direction. As described above, the cross section shape of the base section 51 corresponds to the rear of the containing section 20, so that the fitting and mounting of the base section 51 can be easily manually performed.

As shown in FIG. 5, in a state where the packing ring 5 is not compressed, the seal section 52 has a circular cross section, and a rear side surface which is smoothly joined to the groove bottom surface of the cutout groove 54. The cutout groove 54 has a U-shaped cross section which is rounded in its entirety and the groove bottom surface curved to be convex toward the inner peripheral side thereof. The curvature radius of the groove bottom surface is, e.g., about 2.5 mm. In the temporarily mounted state, the seal section 52 is contained within the large diameter section 22 so as to slightly project from the containing section 20. The outside diameter of the seal section 52 is set to be substantially the same as the inside diameter of the large diameter section 22. Therefore, the seal section 52 is stably arranged without wobbling.

In the temporarily mounted state, the packing ring 5, the lock ring 6, and the piece ring 7 are sandwiched between the joint body 2 and the pressing ring 4, and are position fixed in the pipe axis direction and in the pipe diameter direction. The flanged section 7a of the piece ring 7 is pressed onto the outer peripheral side portion of the seal section 52 from the pipe axis direction. However, the seal section 52 is not subjected to the pressing force to the extent that the seal section 52 is deformed. In addition, the lock ring 6 is not subjected to the pressing force to the extent that the lock ring 6 is reduced in diameter, and is fitted to project from the taper surface 4b.

The pipe joint 10 can be mounted by, e.g., the following procedure. First, as in the temporarily mounted state shown in FIG. 4, the packing ring 5 is fitted and mounted in the containing section 20 at the rear thereof, thereby positioning the packing ring 5 with respect to the containing section 20 (a first step). Next, the pipe 1 to be joined is inserted into the joint body 2 through the containing section 20 (a second step). At this time, when inside diameter D2 of the packing ring 5 is larger than outside diameter D1 of the pipe 1, the pipe 1 can be smoothly inserted without resistance. The pipe joint 10 can prevent the pull of the pipe 1 to hold the initial insertion amount. Therefore, the pipe 1 may only be inserted by a necessary amount.

Then, by the tightening operation of the tightening element 3, the pressing ring 4 is moved toward the joint body 2 (a third step). The piece ring 7 is moved toward the containing section 20 by being pressed by the moving pressing ring 4 to transmit the pressing force to the packing ring 5. However, since the packing ring 5 has been already fitted and mounted in the containing section 20 at the rear thereof, the packing ring 5 cannot be moved in the pipe axis direction. When the pressing ring 4 is moved, the seal section 52 which is the rear end of the packing ring 5 is bent into the rear by being pressed by the pressing ring 4. Therefore, compression caused by the deformation by the bending creates the sealed state as shown in FIG. 2 (a fourth step).

In a case that the pipe joint 10 is not temporarily mounted, the first step and the second step can be reversed in order, and can also be performed at the same time. In addition, when the third step is started, it is sufficiently possible that the fourth step is started at the same time.

Figure 6:
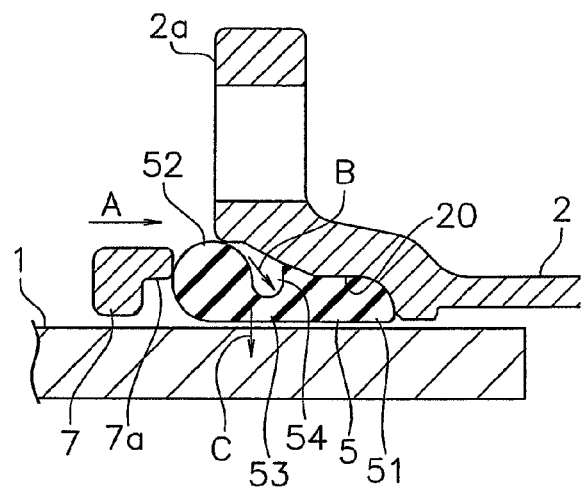
FIG. 6 is a cross-sectional view for describing deformation of a seal section.

As described above, the packing ring 5 is positioned by fitting and mounting the base section 51 in the containing section 20 at the rear thereof, the seal section 52 is subjected to pressing by the pressing ring 4 and is deformed, and compression caused by the deformation creates the sealed state. The deformation of the seal section 52 will be described with reference to FIG. 6. In FIG. 6, only the pipe 1, the joint body 2, the packing ring 5, and the piece ring 7 are shown, and other members are omitted.

The piece ring 7 is moved toward the containing section 20 by being pressed by the pressing ring 4 (arrow A). The flanged section 7a presses the seal section 52. The seal section 52 is bent into the adjacent cutout groove 54 and is deformed (arrow B), and is pressed into the containing section 20. The bent seal section 52 is buried in the cutout groove 54 opened to the outer peripheral side thereof, and the seal section 52 and the connection section 53 of the packing ring 5 are strongly compressed toward the inner peripheral side thereof (arrow C). Accordingly, as shown in FIG. 2, the rear end of the packing ring 5 is locally compressed to make contact with the outer peripheral surface of the pipe 1, thereby sealing a space between the pipe 1 and the containing section 20.

In this way, since the packing ring 5 is not compressed while being moved in the pipe axis direction, the pull of the pipe 1 can be prevented at the time of mounting the pipe joint 10. The seal section 52 has a circular cross section and the rear side surface which is smoothly joined to the groove bottom surface of the cutout groove 54, the flanged section 7a of the piece ring 7 is pressed onto the outer peripheral side portion of the seal section 52 from the pipe axis direction, and the cutout groove 54 has a U-shaped cross section which is rounded in its entirety and the groove bottom surface curved to be convex toward the inner peripheral side thereof, which are advantageous for exhibiting such the deformation of the seal section 52.

The depth and volume of the cutout groove 54 are not particularly limited as long as the deformation of the seal section 52 is exhibited. However, to smoothly bend the seal section 52, a ratio Hb/Ha (see FIG. 5) of a minimum height Hb of the connection section 53 to a maximum height Ha of the seal section 52 with the inner peripheral surface of the packing ring 5 as a reference is preferably 0.2 to 0.5. Specifically, Ha is set to 13 to 14 mm, Hb is set to 4 to 5 mm, and Hb/Ha is set to 0.28 to 0.38, for example.

In the packing ring 5, the material of the base section 51 is preferably harder than that of the seal section 52. In this case, the compression of the base section 51 in the pipe axis direction can be suppressed to easily prevent the pull of the pipe 1, and the seal section 52 is preferentially subjected to the pressing force of the pressing ring 4. Further, the seal section 52 is soft, so that the seal section 52 is easily deformed to improve the contactability with the pipe 1. Therefore, the sealing performance by the packing ring 5 can be enhanced. The rubber hardness (the measurement value of a durometer of type A of JISK6253) is 70±5° in the base section 51, and 55±5° in the seal section 52, for example.

When the packing ring 5 is compressed to some extent to further move the pressing ring 4 toward the joint body 2, the lock ring 6 is pressed into the taper surface 4b and reduced in diameter by being pressed by the pressing ring 4. Accordingly, the blade 6b can bite into the outer peripheral surface of the pipe 1, so that the pipe 1 can be prevented from falling off from the joint body 2.

[Other Embodiments in the First Invention]

Figure 7:
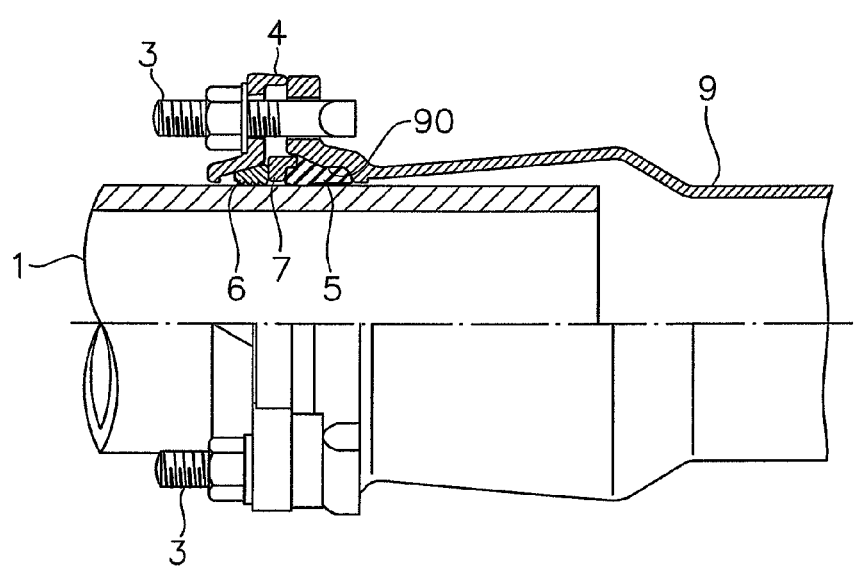
FIG. 7 is a half cross-sectional view showing the pipe joint according to another embodiment of the first invention.

(1) In the above embodiment, the pipe joint in which the pipe joint body is interposed and joined between two pipes to be joined is shown. However, as shown in FIG. 7, in place of the pipe joint body, a pipe 9 which is joined to the pipe 1 to be joined may be used. The socket of the pipe 9 has a containing section 90 expanded in diameter toward the pressing ring 4. The pipe 1 is inserted through the containing section 90.

(2) The shape of the packing ring is not limited to the above embodiment, and various modifications and changes can be made within the scope without departing from the purpose of the present invention. For example, the seal section may be slightly larger than the large diameter section, or may be slightly smaller than the large diameter section.

Figure 8:
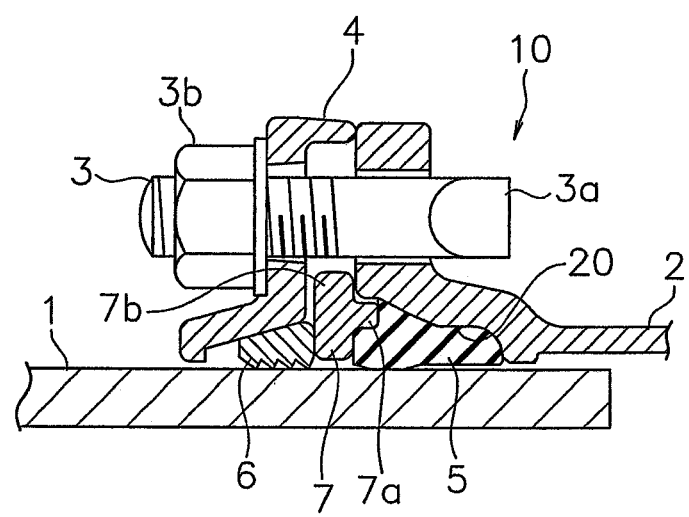
FIG. 8 is a cross-sectional view showing a modification example of a piece ring.

(3) In the above embodiment, an example has been shown in which the piece ring 7 has an L-shaped cross section. However, as shown in FIG. 8, a modification example in which the piece ring 7 has a projection section 7b projecting to the outer peripheral side thereof so as to be formed in a T-shaped cross section can also be considered. According to such a configuration, when the sealing by the packing ring 5 is completed to further move the pressing ring 4 for reducing the lock ring 6 in diameter, the projection section 7b of the piece ring 7 is abutted to the end surface of the joint body 2 to reliably prevent the excessive pressing of the packing ring 5.

(4) In the above embodiment, an example has been shown in which the piece ring is interposed between the pressing ring and the packing ring. However, the packing ring may be directly pressed by the pressing ring, without interposing the piece ring therebetween. In such a case as well, it is favorable to press the outer peripheral side portion of the seal section in a concentrated manner so as to easily bend the seal section into the rear.

(5) The pipe to be joined is not limited to a water pipe, and may be a fluid pipe used for fluids such as various types of liquids and gas other than water.

[Second Invention]

Figure 9:
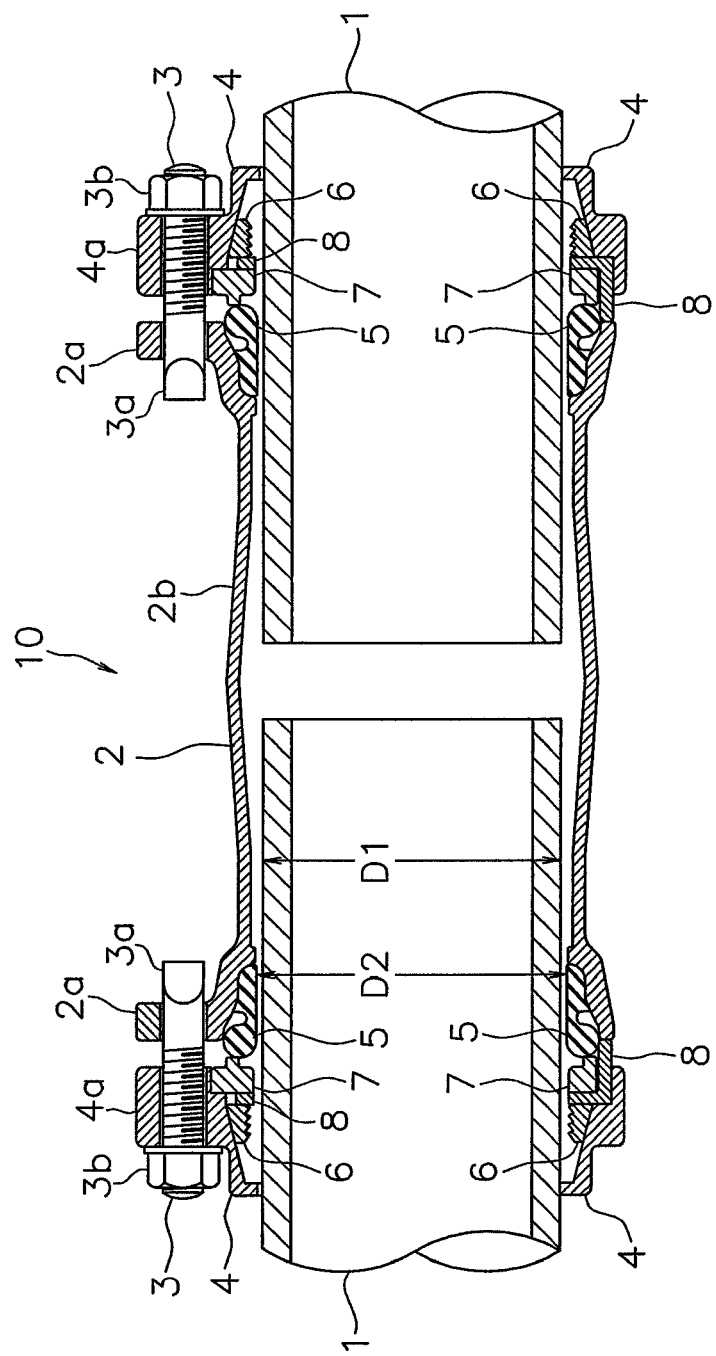
FIG. 9 is a cross-sectional view showing an example of a pipe joint according to a second invention.
Figure 10:
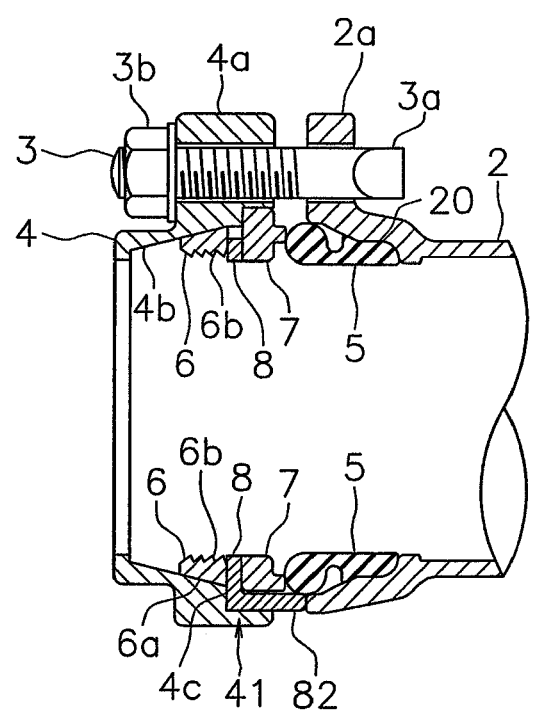
FIG. 10 is an enlarged sectional view of the essential part of the pipe joint.

FIG. 9 is a cross-sectional view showing an example of a pipe joint according to a second invention, and shows a temporarily mounted pipe joint 10. In FIG. 10, a state before a pipe 1 to be joined is inserted into a pipe joint body 2 (hereinafter, simply called a "joint body 2") is shown, and the inside thereof is not illustrated. The same members as the members described in the first invention are indicated by the same reference numerals.

The pipe joint 10 is a device for joining the pair of pipes 1, 1 to be joined via the joint body 2 in a water-tight manner. However, in FIG. 9, the pipe joint 10 is in the temporarily mounted state, and the pipes 1, 1 have not been joined in the water-tight manner yet. In the present embodiment, the pipe 1 is a water pipe made of polyethylene. However, the pipe 1 is not limited thereto, and may be a fluid pipe made of other materials, such as a polyvinyl chloride pipe.

The pipe joint 10 has the joint body 2 into which the pipe 1 is inserted, a pressing ring 4 fitted over the pipe 1, a lock ring 6, as a separation prevention member, fitted onto the inner peripheral surface of the pressing ring 4, a tightening element 3 capable of operating and moving the pressing ring 4 toward the joint body 2, and a packing ring 5 which is compressed by being pressed by the pressing ring 4 that is moved by the operation of the tightening element 3 and seals the inner peripheral surface of the joint body 2 with respect to the outer peripheral surface of the pipe 1. Further, a slide piece 8 is arranged between the lock ring 6 and the packing ring 5. The tightening element 3 has a T-head bolt 3a and a nut 3b.

The joint body 2 is arranged between a pair of pressing rings 4, and is fitted and mounted over the outer periphery of the pipe 1 with a peripheral gap. A containing section 20 expanded in diameter toward the pressing ring 4 is formed on the inner peripheral surface at each of both ends of the joint body 2. The joint body 2 has a flanged projection section 2a provided on the outer peripheral side of the containing section 20, and a tubular barrel section 2b which center portion is swelled outward. A bolt hole for inserting the T-head bolt 3a therethrough is opened in the projection section 2a. The joint body 2 is made of a ductile iron. However, the joint body 2 may be formed of other material such as a stainless steel and a synthetic resin.

Figure 11:
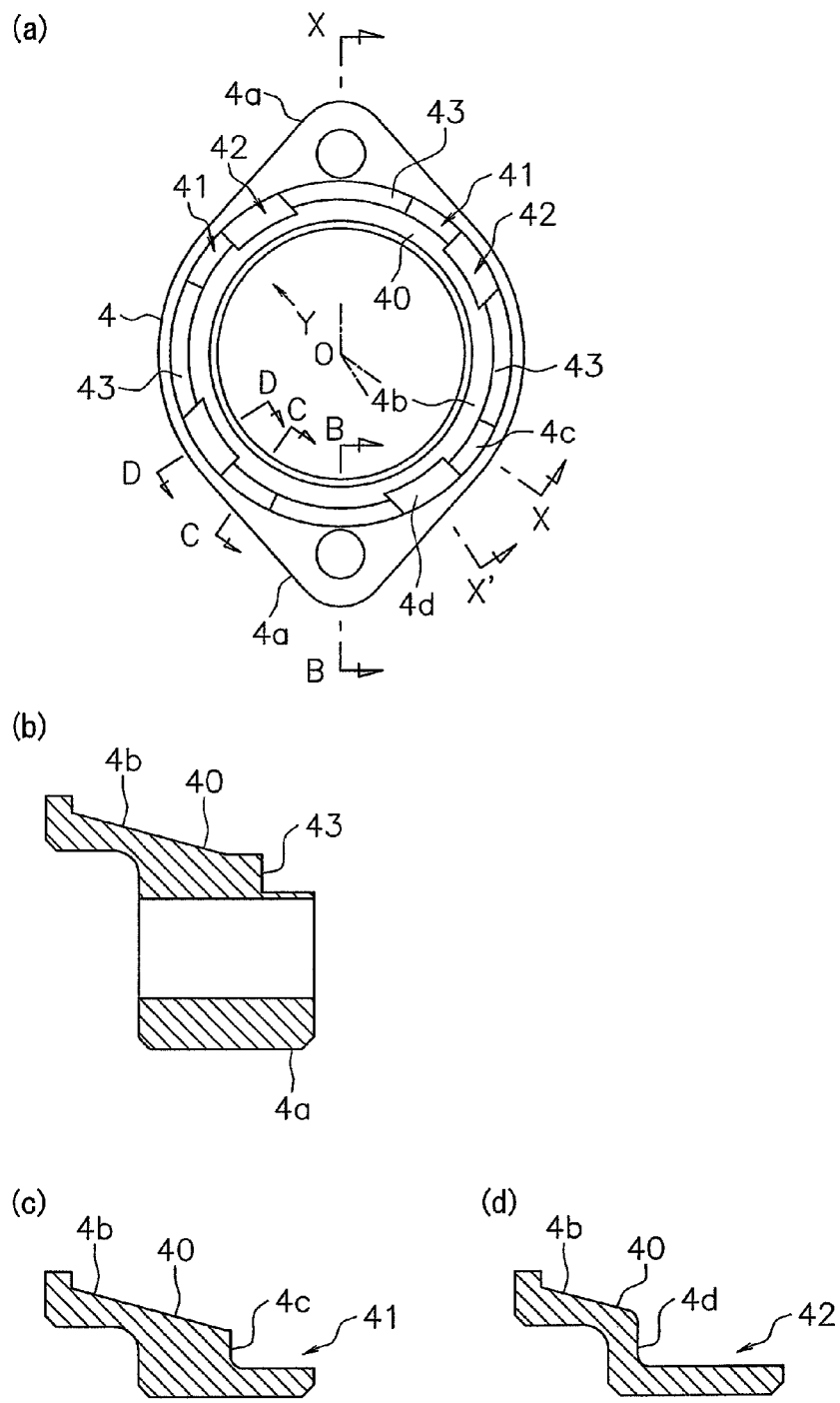
FIG. 11(a) is a front view of a pressing ring.
FIG. 11(b) is a cross-sectional view of the pressing ring taken along line B-B.
FIG. 11(c) is a cross-sectional view of the pressing ring taken along line C-C.
FIG. 11(d) is a cross-sectional view of the pressing ring taken along line D-D.

FIGS. 11(a), 11(b), 11(c), and 11(d) show the pressing ring 4 alone, in which FIG. 11(a) is a front view thereof, FIG. 11(b) is a cross-sectional view taken along line B-B, FIG. 11(c) is a cross-sectional view taken along line C-C, and FIG. 11(d) is a cross-sectional view taken along line D-D. The pressing ring 4 shown on the left side of FIG. 9 corresponds to the cross section taken along line X-O-X of FIG. 11(a). The pressing ring 4 has a flanged projection section 4a opposite to the projection section 2a of the joint body 2. The T-head bolt 3a is inserted through a bolt hole provided in the projection section 4a. In the temporarily mounted state shown in FIGS. 9 and 10, the advancing movement of the pressing ring 4 toward the joint body 2 is regulated, and the projection section 2a and the projection section 4a are sandwiched by the tightening element 3 with a predetermined space therebetween.

A containing section 40 opened toward the joint body 2 is formed on the inner peripheral surface of the pressing ring 4. The containing section 40 contains the lock ring 6 on the inner peripheral side of a taper surface 4b which is reduced in diameter toward the rear thereof, and contains the slide piece 8 at the front thereof. The lock ring 6 has an outer peripheral surface 6a which is formed in a taper shape with substantially the same inclination as the taper surface 4b, and an inner peripheral surface which has a blade 6b which can bite into the outer peripheral surface of the pipe 1. The lock ring 6 is made of a harder material than the pipe 1, is split at one point in the peripheral direction, and can be reduced in diameter by elastic deformation.

Figure 12:
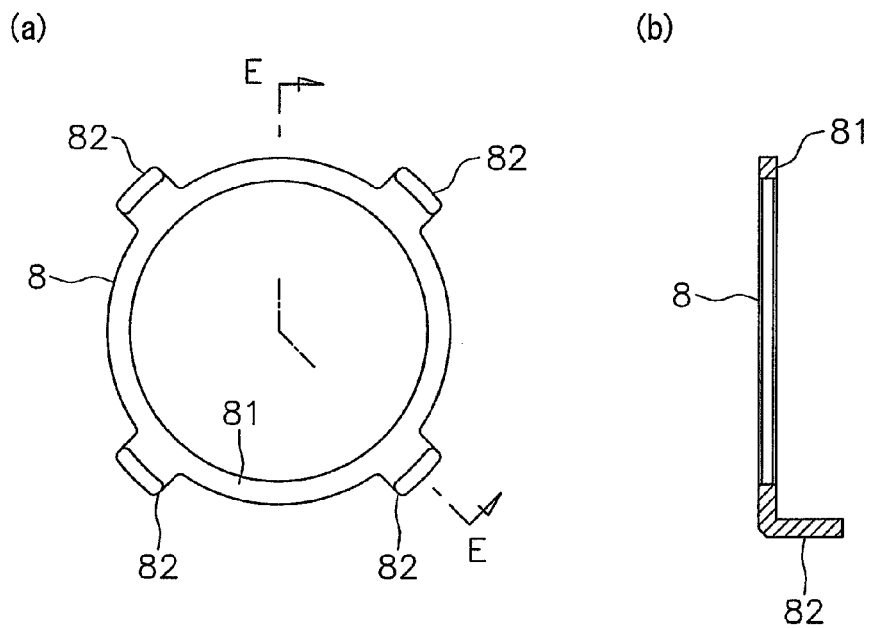
FIG. 12(a) is a front view of a slide piece.
FIG. 12(b) is a cross-sectional view of the slide piece taken along line E-E.

As shown in FIGS. 12(a) and 12(b), the slide piece 8 has a body section 81 extending in the pipe peripheral direction, and a projection section 82 which projects from the body section 81 to the outer peripheral side thereof and extends in the pipe axis direction. In the temporarily mounted state shown in FIG. 9, the body section 81 annularly formed along the pipe peripheral direction is abutted to the lock ring 6 from the pipe axis direction. However, the lock ring 6 is not subjected to the pressing force to the extent that the lock ring 6 is sufficiently reduced in diameter. The blade 6b is separated from the outer peripheral surface of the pipe 1. A plurality of (in this embodiment, four) projection sections 82 are formed in the pipe peripheral direction. Each of the projection sections 82 is widened in the pipe peripheral direction, and is bent in an L shape.

As shown on the lower side of FIG. 10, the end of the projection section 82 is received by the joint body 2 from the pipe axis direction, and the back surface thereof (the surface facing the pressing ring 4) is received by the inner peripheral surface of the pressing ring 4 from the pipe axis direction. In this way, the projection section 82 is sandwiched between the joint body 2 and the pressing ring 4 in the pipe axis direction. Therefore, the advancing movement of the pressing ring 4 toward the joint body 2 is regulated in the temporarily mounted state. The slide piece 8 is preferably made of metal. In this embodiment, the slide piece 8 is made of stainless steel, but the slide piece 8 may be formed of other materials.

Figure 13:
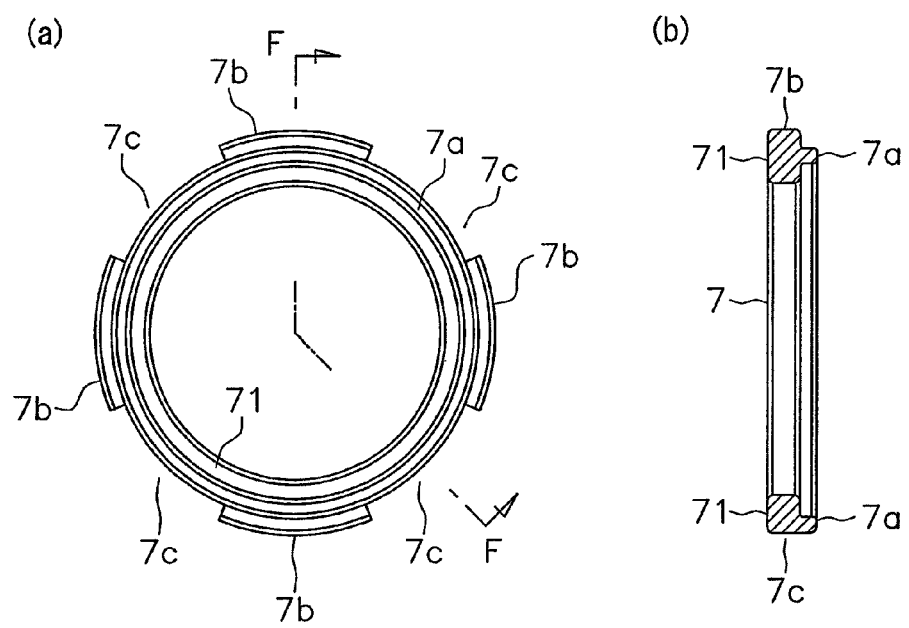
FIG. 13(a) is a front view of a piece ring.
FIG. 13(b) is a cross-sectional view of the piece ring taken along line F-F.

In this embodiment, the piece ring 7 is arranged between the slide piece 8 and the packing ring 5. At the time of piping, pressing by the pressing ring 4 that is moved by the operation of the tightening element 3 is transmitted to the packing ring 5 via the piece ring 7. As shown in FIGS. 13(a) and 13(b), the piece ring 7 has a body section 71 extending in the pipe peripheral direction, a flanged section 7a projecting toward the packing ring 5, and a projection section 7b projecting to the outer peripheral side thereof. The body section 71 and the flanged section 7a are annularly formed along the pipe peripheral direction. A plurality of (in this embodiment, four) projection sections 7b are formed in the pipe peripheral direction, and the projection sections 82 are arranged in gaps 7c between the projection sections 7b. The length of the gaps 7c in the pipe peripheral direction is set to allow the later-described movement of the projection sections 82.

The piece ring 7 is inserted into the containing section 40 at the front thereof. The back surface of the projection sections 7b is received by the inner peripheral surface of the pressing ring 4 from the pipe axis direction. In the temporarily mounted state, the flanged section 7a is abutted to the outer peripheral side portion at the rear end of the packing ring 5 from the pipe axis direction. However, the packing ring 5 is not subjected to the pressing force to the extent that the packing ring 5 is sufficiently compressed. Unless the movement regulation of the pressing ring 4 is released, the sealed state by the packing ring 5 cannot be created. The piece ring 7 is preferably made of metal. In this embodiment, the piece ring 7 is made of stainless steel, but the piece ring 7 may be formed of other materials.

Figure 14:
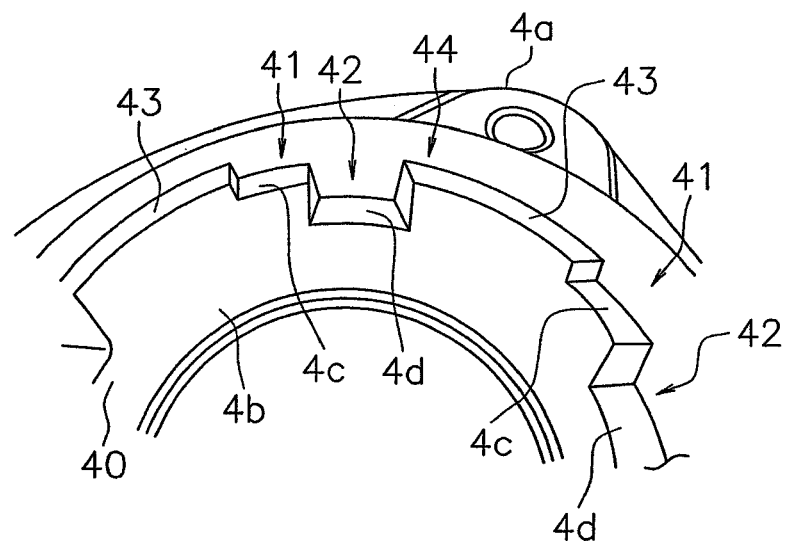
FIG. 14 is a perspective view of FIG. 11(a) seen in the direction indicated by arrow Y.
Figure 15:
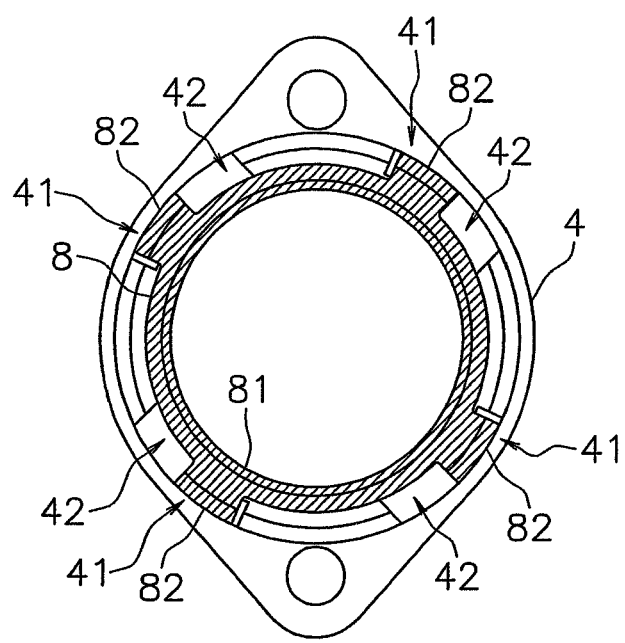
FIG. 15 is a diagram showing the position of projection sections in the temporarily mounted state.
Figure 16:
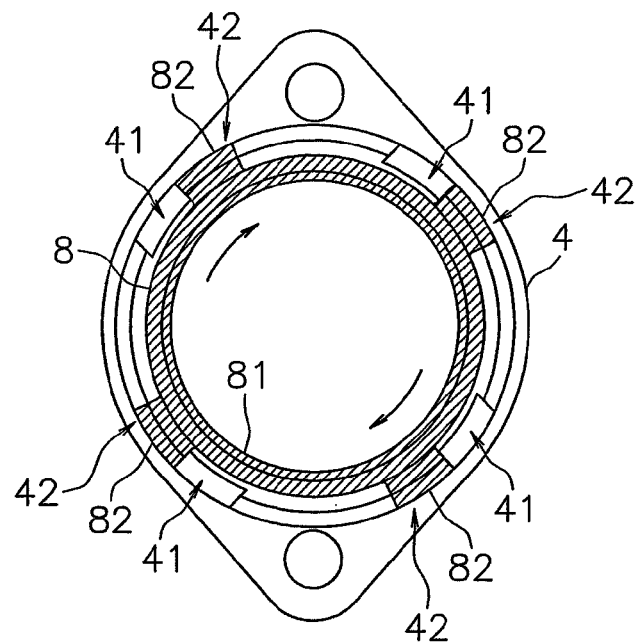
FIG. 16 is a diagram showing the positions of the projection sections when the movement regulation of the pressing ring is released.

As shown in FIG. 14, on the inner peripheral surface of the pressing ring 4, a temporary retaining section 41 having a rear surface 4c which can receive the back surface of the projection section 82 from the pipe axis direction and an introducing section 42 which is located toward the rear thereof from the temporary retaining section 41 in the pipe axis direction and allows introduction of the projection section 82 are formed. The temporary retaining section 41 and the introducing section 42 are formed in different positions in the pipe peripheral direction, and are arranged adjacent to each other in this embodiment. In the temporarily mounted state, as shown in FIG. 15, the projection section 82 is arranged in the temporary retaining section 41, and as shown in FIG. 10, the rear surface 4c receives the back surface of the projection section 82. In FIGS. 15 and 16, for easy understanding, the slide piece 8 is hatched.

In the temporarily mounted pipe joint 10, the joint body 2 and the pressing ring 4 are connected by the tightening element 3, and the packing ring 5, the lock ring 6, the piece ring 7, and the slide piece 8 are integrally held between the joint body 2 and the pressing ring 4. The projection section 82 is received by the joint body 2, and the back surface of the projection section 82 is received by the rear surface 4c of the pressing ring 4. Therefore, the advancing movement of the pressing ring 4 toward the joint body 2 is regulated. Accordingly, when the temporarily mounted pipe joint 10 is conveyed to a piping site, the tightening element 3 can be prevented from being unintentionally tightened, so that the packing ring 5 is not accidentally compressed.

The pipe joint 10 can be mounted on the pipe 1 by, for example, the following procedure. First, as shown in FIG. 10, the slide piece 8 is received by both the joint body 2 and the pressing ring 4 from the pipe axis direction, the tightening element 3 is tightened to temporarily mount the pipe joint 10. And, as shown in FIG. 9, the pipe 1 is inserted into the joint body 2 after, if necessary, the operation of conveying the pipe joint 10 into the piping site (insertion step). At this stage, as shown in FIG. 15, the projection section 82 of the slide piece 8 is arranged in the temporary retaining section 41.

Figure 17:
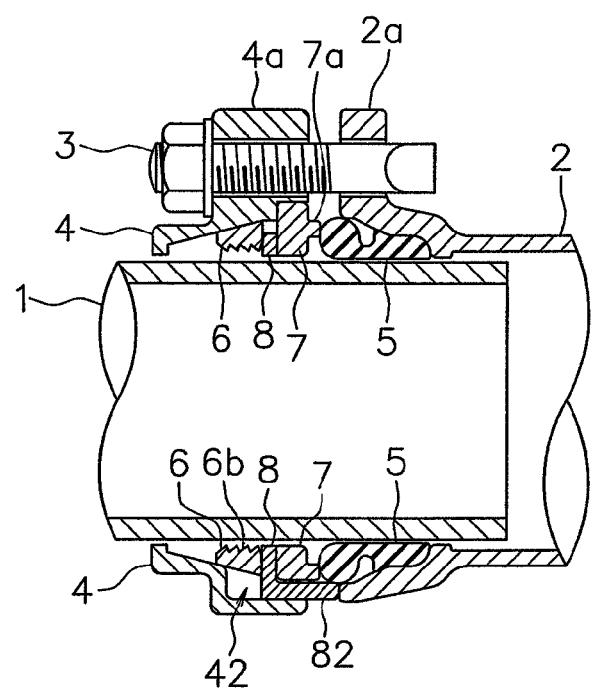
FIG. 17 is a cross-sectional view of the pipe joint when the movement regulation of the pressing ring is released.
Figure 18:
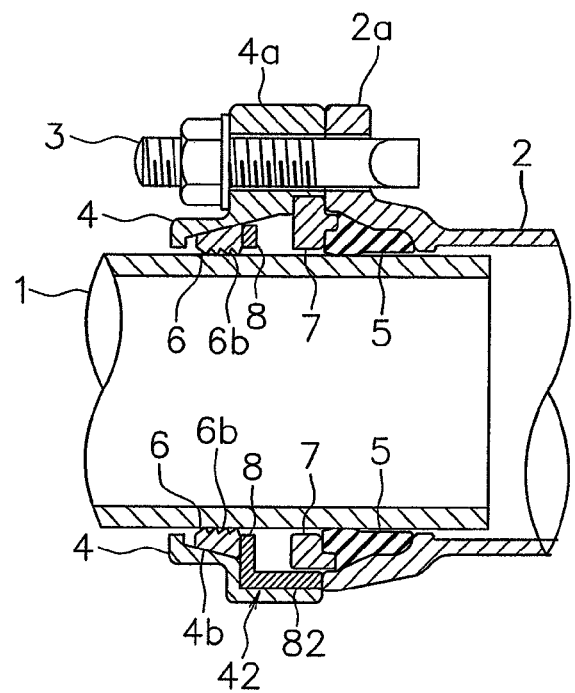
FIG. 18 is a cross-sectional view of the pipe joint when a tightening element is tightened.

Next, as shown in FIG. 16, the slide piece 8 is slid (i.e., rotatably moved) in the pipe peripheral direction to release the reception of the slide piece 8 by the pressing ring 4 in the pipe axis direction (releasing step). That is, the slide piece 8 is rotated to arrange the projection section 82 in the introducing section 42, and as shown on the lower side of FIG. 17, the back surface side of the projection section 82 is opened. Accordingly, the slide piece 8 is not received by the pressing ring 4, so that the movement regulation of the pressing ring 4 is released. Such operation of the slide piece 8 can be performed by the operator by holding the projection section 82 with hand or a jig to rotate the projection section 82. FIGS. 17 and 18 correspond to the cross section taken along line X-O-X' of FIG. 11(a).

After the releasing step, the tightening element 3 is further tightened to move the pressing ring 4 toward the joint body 2 (tightening step). Accordingly, as shown in FIG. 18, the packing ring 5 is compressed by being pressed by the moving pressing ring 4. Therefore, the space between the outer peripheral surface of the pipe 1 and the joint body 2 is sealed. In addition, the projection section 82 is introduced into the introducing section 42 with the movement of the pressing ring 4. Therefore, the lock ring 6 is pressed by the body section 81. As the projection section 82 enters into the rear side of the introducing section 42, the lock ring 6 is pressed into the rear side of the taper surface 4b and is reduced in diameter. Then, the blade 6b can bite into the outer peripheral surface of the pipe 1 to prevent the pipe 1 from falling off from the joint body 2.

As described above, according to the pipe joint 10, the advancing movement of the pressing ring 4 can be regulated in the temporarily mounted state. In addition, the operation of releasing the movement regulation of the pressing ring 4 can be easily performed, and after releasing, the pipe joint 10 is mounted on the pipe 1 only by tightening the tightening element 3. Further, since the slide piece 8 is used as described above, the number of components is not excessive. Since the slide piece 8 is not broken, the pipe joint 10 can be reused as is even if the pipe joint 10 is dismounted after the completion of piping.

As shown in FIGS. 11(a), 11(b), 11(c), 11(d), and FIG. 14, a step section 43 which receives the projection section 7b of the piece ring 7 from the pipe axis direction is formed on the inner peripheral surface of the pressing ring 4. The length from the end surface of the pressing ring 4 to the step section 43 in the pipe axis direction is equal to or more than the thickness of the projection section 7b. Therefore, when the tightening element 3 is strongly tightened, the end surface of the pressing ring 4 can be abutted to the joint body 2. The rear surface 4c of the temporary retaining section 41 is located toward the rear side from the step section 43, and the taper surface 4b is formed from the rear surface 4c toward the rear side. In addition, a rear surface 4d of the introducing section 42 is located toward the rear side from the rear surface 4c. The pressing ring 4 has a step shape in its entirety.

Further, in this embodiment, a positioning section 44 is formed adjacent to the introducing section 42 in the pipe peripheral direction, and receives the slide piece 8 slid in the pipe peripheral direction. Therefore, the projection section 82 can be positioned into the introducing section 42. For this reason, the operator can rotate the slide piece 8 to the position where the slide piece 8 is received by the positioning section 44 without paying attention to the slide amount of the slide piece 8. The positioning section 44 may be provided on the end surface of the pressing ring 4 and the piece ring 7, and a portion of the slide piece 8 other than the projection section 82 can be received by the positioning section 44.

In this embodiment, the piece ring 7 is provided which compresses the packing ring 5 with pressing by the pressing ring 4 that is moved by the operation of the tightening element 3. Therefore, it is unnecessary to directly press the packing ring 5 by the pressing ring 4. Consequently, the shape of the pressing ring 4 is not particularly limited, so that the existing pressing ring can be used, which is economical. However, in the second invention, the packing ring can also be directly pressed by the pressing ring without using the piece ring. In such a case, the pressing ring may include a portion occupied by the piece ring.

As shown in FIG. 5, the packing ring 5 has the base section 51 contained within the joint body 2 at the rear of the inner peripheral surface thereof, the seal section 52 contained within the joint body 2 at the front thereof, and the connection section 53 which connects the base section 51 and the seal section 52 and has the cutout groove 54 formed on the outer peripheral side thereof, and is contained within the containing section 20 shown in FIG. 3. The configuration and action of the packing ring 5 and the containing section 20 have been already described in the first invention.

When the packing ring 5 is subjected to pressing by the pressing ring 4 from the temporarily mounted state, the seal section 52 is bent thereinto and is deformed, and compression caused by the deformation creates the sealed state. The deformation of the seal section 52 has been already described with reference to FIG. 6. Accordingly, as shown in FIG. 18, the rear end of the packing ring 5 is locally compressed to make contact with the outer peripheral surface of the pipe 1, thereby sealing the space between the pipe 1 and the joint body 2.

The packing ring 5 is previously fitted and mounted in the containing section 20 at the rear thereof. The relative position of the packing ring 5 with respect to the containing section 20 in the sealed state is not substantially changed from the temporarily mounted state. It is unnecessary to move the packing ring 5 in the pipe axis direction with the advancing movement of the pressing ring 4. Therefore, the moving distance of the pressing ring 4 is shortened to reduce the tightening amount of the tightening element 3, and the slide piece 8 can be made compact. In addition, the pull of the pipe 1 to the joint body 2 side can be prevented to make the insertion amount of the pipe 1 constant.

In this embodiment, when the tightening element 3 is tightened after the movement regulation of the pressing ring 4 is released, the piece ring 7 is moved toward the containing section 20, and at the same time, the projection section 82 is introduced into the introducing section 42. For this reason, the compression of the packing ring 5 and the reduction of the lock ring 6 in diameter can be performed at the same time, the tightening amount of the tightening element 3 can be made small, and the slide piece 8 can be made more compact. However, the second invention is not limited thereto, and the lock ring may be reduced in diameter after the packing ring is compressed.

[Other Embodiments in the Second Invention]

Figure 19:
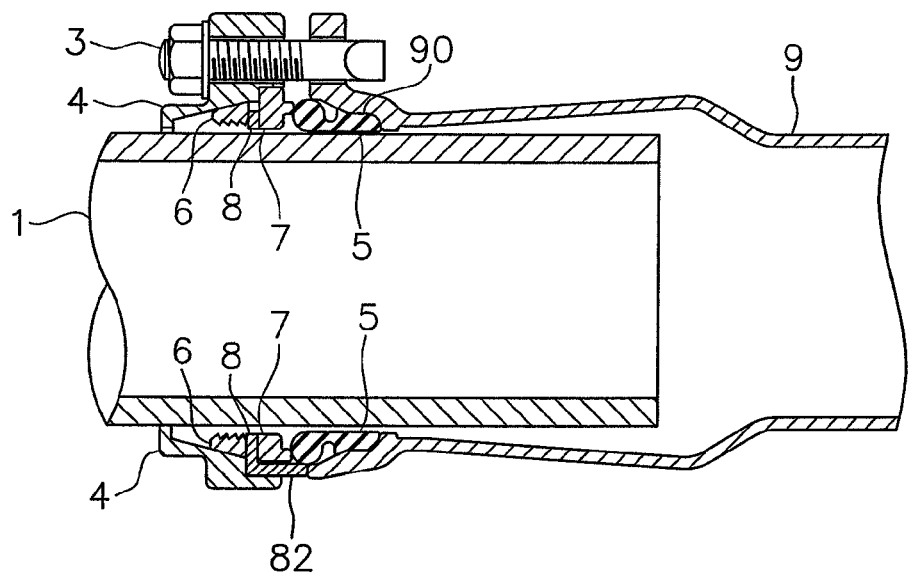
FIG. 19 is a cross-sectional view showing the pipe joint according to another embodiment of the second invention.

(1) In the above embodiment, the pipe joint in which the pipe joint body is interposed and joined between two pipes to be joined is shown. However, as shown in FIG. 19, in place of the pipe joint body, a pipe 9 which is joined to the pipe 1 to be joined may be used. The socket of the pipe 9 has a containing section 90 expanded in diameter toward the pressing ring 4. The pipe 1 is inserted through the containing section 90. Similar to the above, the slide piece 8 is arranged between the lock ring 6 and the packing ring 5, and in the illustrated temporarily mounted state, the advancing movement of the pressing ring 4 toward the pipe 9 is regulated.

(2) In the above embodiment, the slide piece 8 has four projection sections 82 in the pipe peripheral direction. However, the slide piece 8 is not limited thereto as long as the advancing movement of the pressing ring can be appropriately regulated in the temporarily mounted state. Therefore, for example, two projection sections may be disposed to be opposite to each other in the diameter direction, and three projection sections may be equally spaced.

Figure 20:
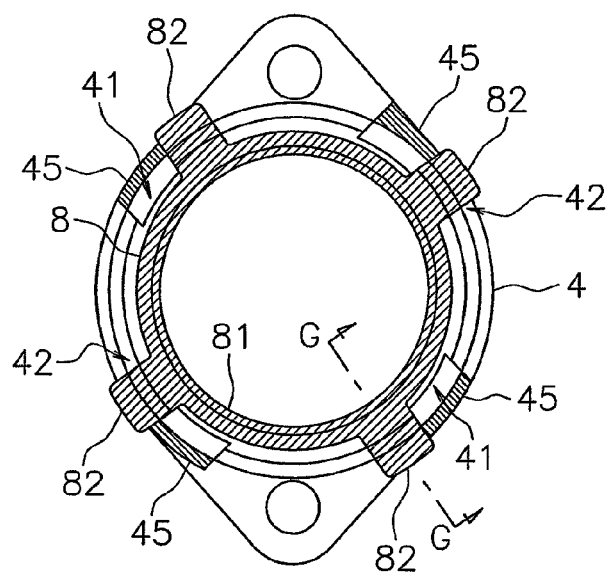
FIG. 20 is a front view showing the pressing ring and the slide piece of the pipe joint according to a further embodiment of the second invention.
Figure 21:
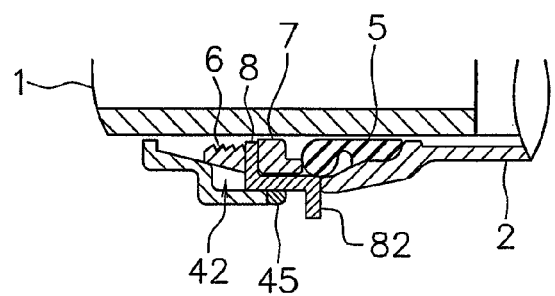
FIG. 21(a) is a cross-sectional view taken along line G-G of the pipe joint of FIG. 20 before the tightening element is tightened.
FIG. 21(b) is a cross-sectional view taken along line G-G of the pipe joint of FIG. 20 after the tightening element is tightened.
Figure 21:
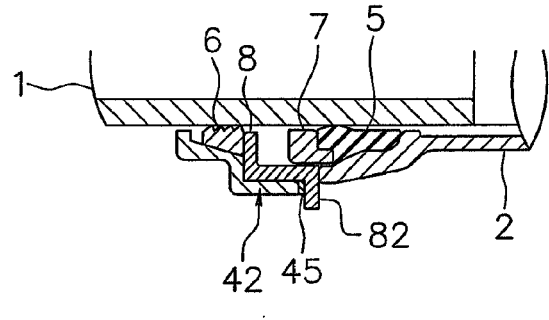

(3) The shape of the slide piece is not limited to the above embodiment, and various modifications and changes can be made within the scope without departing from the purpose of the present invention. In the slide piece 8 shown in FIGS. 20, 21(*a*), and 21(*b*), the end of the projection section 82 projects to the outer peripheral side thereof, and the projection section 82 can be used as a tab when the operator slides the slide piece 8. In the pressing ring 4, a cutout 45 shown by hatching is provided in the moving range of the projection section 82 so as not to inhibit the rotation movement of the slide piece 8.

Figure 22:
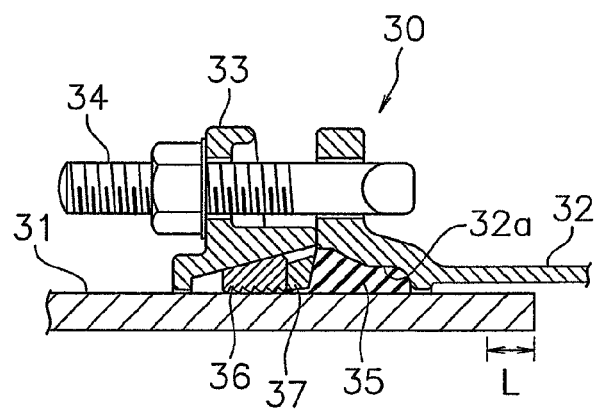
FIG. 22 is a cross-sectional view showing an essential part of a conventional pipe joint.
Figure 23:
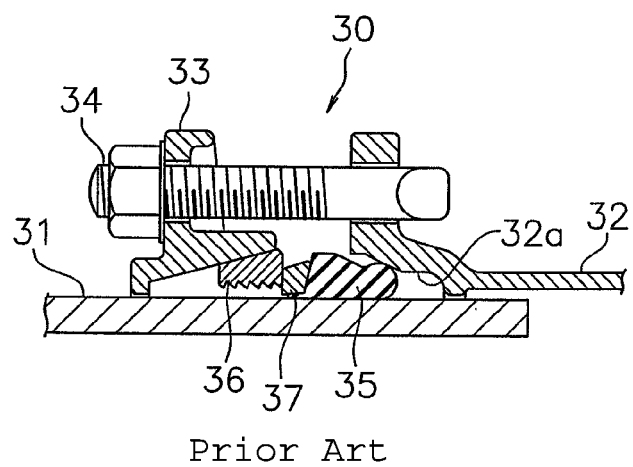
FIG. 23 is a cross-sectional view showing a state while the pipe joint shown in FIG. 22 is piped.
Figure 24:
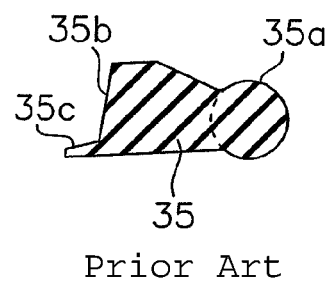
FIG. 24 is a cross-sectional view of a packing ring included in the pipe joint shown in FIG. 22.

(4) The shape of the packing ring is not limited to the above embodiment, and various modifications and changes can be made within the scope without departing from the purpose of the present invention. Therefore, for example, the seal section may be slightly larger than the large diameter section, or may be slightly smaller than the large diameter section, and the existing packing ring as shown in FIGS. 22 and 23 may be adopted.

(5) The pipe to be joined is not limited to a water pipe, and may be a fluid pipe used for fluids such as various types of liquids and gas other than water.

DESCRIPTION OF REFERENCE SIGNS

1 Pipe to be joined
2 Pipe joint body
3 Tightening element
3*a* T-head bolt
3*b* Nut
4 Pressing ring
4*b* Taper surface
4*c* Rear surface
5 Packing ring
6 Lock ring
7 Piece ring
7*a* Flanged section
8 Slide piece
10 Pipe joint
20 Containing section
41 Temporary retaining section
42 Introducing section
44 Positioning section
51 Base section
52 Seal section
53 Connection section
54 Cutout groove
81 Body section
82 Projection section

The invention claimed is:

1. A pipe joint in a temporary mounted state, comprising:
a pressing ring fitted over a pipe to be joined;
a pipe or a pipe joint body which has a containing section expanded in diameter toward the pressing ring and into which the pipe to be joined is inserted through the containing section;
a tightening element capable of operating and moving the pressing ring toward the pipe or the pipe joint body; and
a packing ring, which is compressible being pressed by the pressing ring that is moved by the operation of the tightening element, wherein
the packing ring includes a base section fitted and mounted in the containing section at a rear thereof, a seal section contained within the containing section at a front thereof, and a connection section which connects the base section and the seal section and has a cutout groove formed on an outer peripheral side thereof,
the temporary mounted state being characterized by the packing ring being positioned by mounting and fitting the base section snugly into the containing section so that the seal section is bent into the cutout groove and is deformed by the pressing ring, and compression caused by the deformation creates a sealed state in a final mounted state,
the cutout groove is intact in the temporary mounted state,
said base section has a cross section shape corresponding to the rear of the containing section in a state in which no external force is applied, and
a front end of the base section abuts a wall provided at a rearmost end of the containing section in the temporary mounted state.

2. The pipe joint in a temporary mounted state according to claim 1, wherein in a state where the packing ring is not compressed, the seal section has a circular cross section, and a rear side surface of the seal section is smoothly joined to a groove bottom surface of the cutout groove.

3. The pipe joint in a temporary mounted state according to claim 1, wherein a piece ring having a flanged section which projects toward the packing ring is interposed between the pressing ring and the packing ring, and the flanged section is pressed onto an outer peripheral side of the seal section from a pipe axis direction.

4. The pipe joint in a temporary mounted state according to claim 1, wherein in a state where the base section is fitted and mounted in the containing section at the rear thereof to position the packing ring and the seal section is not deformed, a minimum inside diameter of the packing ring is larger than an outside diameter of the pipe to be joined.

5. The pipe joint in a temporary mounted state according to claim 1, wherein the base section is formed of a harder material than the seal section.

6. The pipe joint in a temporary mounted state according to claim 1, wherein the bent seal section is buried in the cutout groove to make contact with an outer peripheral surface of the pipe to be joined.

7. A method for mounting a sealed pipe joint formed from the pipe joint in a temporary mounted state according to claim 1, the sealed pipe joint sealing a space between the containing section of the pipe or a pipe joint body into which a pipe to be joined is inserted and an outer peripheral surface of the pipe to be joined, the method comprising:

fitting and mounting the packing ring of the pipe joint in the temporary mounted state in the containing section at the rear thereof of the pipe or the pipe joint body and positioning the packing ring with respect to the containing section;

inserting the pipe to be joined into the pipe or the pipe joint body through the containing section;

moving the pressing ring fitted over the pipe to be joined toward the pipe or the pipe joint body; and bending a rear end of the packing ring into the rear of the containing section by pressing by the pressing ring and creating a sealed state by compression caused by deformation of the bending in a final mounted state.

8. The method according to claim 7, wherein the bent rear end of the packing ring is buried in the cutout groove to make contact with the outer peripheral surface of the pipe to be joined.

* * * * *